United States Patent [19]
van der Waaij

[11] 3,893,457
[45] July 8, 1975

[54] GERM-FREE OPERATING TABLE
[75] Inventor: Dirk van der Waaij, Voorburg, Netherlands
[73] Assignee: Pielkenrood-Vinitex N.V., Assendelft, Netherlands
[22] Filed: June 16, 1972
[21] Appl. No.: 263,587

[30] Foreign Application Priority Data
June 17, 1971   Netherlands ..................... 7108371
Dec. 10, 1971   Netherlands ..................... 7116954

[52] U.S. Cl. ............................. 128/132 R; 128/1 R
[51] Int. Cl. ....................... A61g 7/04; A61g 13/00
[58] Field of Search. 55/DIG. 18, DIG. 29, DIG. 36, 55/97, 413, 416, 467, 473, 414, 385; 21/74 R, 53; 62/256, 261; 98/36, 89, 115; 128/1 R, 132; 5/163, 284, 2 B, 362, 60, 92; 269/323–328, 322; 135/5 R, 16 U; 4/146

[56] References Cited
UNITED STATES PATENTS

| | | | |
|---|---|---|---|
| 1,142,876 | 6/1915 | Davis et al. | 98/89 |
| 1,395,912 | 11/1921 | Ferentzi | 98/89 |
| 2,461,432 | 2/1949 | Mitchell | 62/261 X |
| 2,771,088 | 11/1956 | Soldan | 135/5 R |
| 2,963,881 | 12/1960 | Stark | 55/DIG. 29 |
| 3,131,687 | 5/1964 | Kalla | 55/DIG. 36 |
| 3,279,883 | 10/1966 | Thompson et al. | 55/DIG. 29 |
| 3,292,525 | 12/1966 | Jensen | 55/DIG. 36 |
| 3,354,495 | 11/1967 | Lawrence | 21/74 R |
| 3,478,535 | 11/1969 | Perez et al. | 62/256 X |
| 3,494,112 | 2/1970 | Deckas | 55/DIG. 18 |
| 3,505,989 | 4/1970 | Truhan | 55/467 |
| 3,511,162 | 5/1970 | Truhan | 98/36 |
| 3,646,590 | 2/1972 | Bolt | 4/146 |
| 3,724,172 | 4/1973 | Wood | 55/DIG. 29 |

OTHER PUBLICATIONS
Laminar/Flow Clean Room Handbook by Boyd Agnew, published by Agnew-Higgins, 7532 Anthony Ave., Garden Grove, Calif., copyright 1963, Library of Congress, 65-26311, received 1/21/66, p. 66.
Liberty Industries Inc., 598 Deming Rd., Berlin, Conn., 06010, received 2/2/67, pp. 10 & 11, p. 18.

*Primary Examiner*—Frank W. Lutter
*Assistant Examiner*—N. Greenblum
*Attorney, Agent, or Firm*—George F. Smyth

[57] ABSTRACT

A device for keeping the direct environment of an operating table germ-free, comprising a filter cabinet with one or more fans and having a substantially vertical exit surface for the filtered germ-free air, which cabinet is to be positioned at one extremity of an operating table so as to blow a substantially germ-free air flow over this table, which cabinet has, furthermore, such a width that the emitted air flow also covers the space at both sides of the table intended for the surgeons and their assistants, curtains being provided for isolating the upper part of this lateral space from the ambient air, and additional air discharge openings being used for amplifying the air flow near the head of the table and for influencing the air flow near the bottom below the curtains.

7 Claims, 5 Drawing Figures

GERM-FREE OPERATING TABLE

The measures normally taken for preventing contamination of surgical wounds are often insufficient for special operations. This is in particular the case with transplantations, since, then, supression of the natural defense mechanism of the patient is required in order to prevent repulsion of the extraneous tissue. As a consequence thereof the patient has no longer any resistance against infections, and the current disinfection measures prove, then, to be deficient.

Now the ambient air is an important source of contamination, and in particular the dust particles floating therein act as germ carriers. It is, therefore, to be recommended to nurse such patients, which are extremenly susceptible to contamination, in a germ-free environment. It is, however, very objectionable to make an operating theatre completely germ-free. This applies, in particular, to a surgeons and all the attendants present in the operating theatre. Also all devices and instruments should then be made germ-free, which is extremely time-consuming and often even impossible. Attempts have therefore been made to restrict the area to be sterilized to the operating table and the instrument shelves. In a publication of R. Cook and N. A. Boyd in Brit. J. Surg. ( 58, 1 c 1971, 01 ) 48 . . . 52, a simple device is described, by means of which the operating area may be kept germ-free. To this end this device comprises a filter cabinet provided with one or more fans and having a substantially vertical exit surface for the germ-free air, which filter cabinet is to be positioned at one extremity (in general the feet end) of an operating table, so as to direct a substantially horizontal germ-free air flow over this table and the patient lying thereon.

Such a device with the dimensions stated in this publication is, however, not able to keep the direct environment of the patient germ-free. It has appeared that the surgeons and assistants working laterally of the table will generate by their movements, especially of the arms, such turbulences in this air flow so that germs from the ambient air may be introduced into this air flow. This may be demonstrated in a simple manner by placing dishes with a suitable culture medium, and simulating the actual operation circumstances. Whereas the undisturbed air flow appears to keep the environment of the table germ free, the movement of persons in the immediate vicinity of this table will lead to a small but nevertheless clearly demonstrable development of germs on such dishes, which is inadmissible.

The invention provides an improvement of such a device for avoiding such additional contamination.

To that end the device according to the invention is characterized in that the filter cabinet has such a width that the discharged air flow also covers the space for the surgeons and assistants laterally of the operating table.

Additional means may be provided for preventing unfiltered air from penetrating into the direct environment of the operating table.

The invention will be elucidated below by reference to the drawings, showing in:

FIG. 1 a representation in perspective of a device according to the invention;

Figure 3:
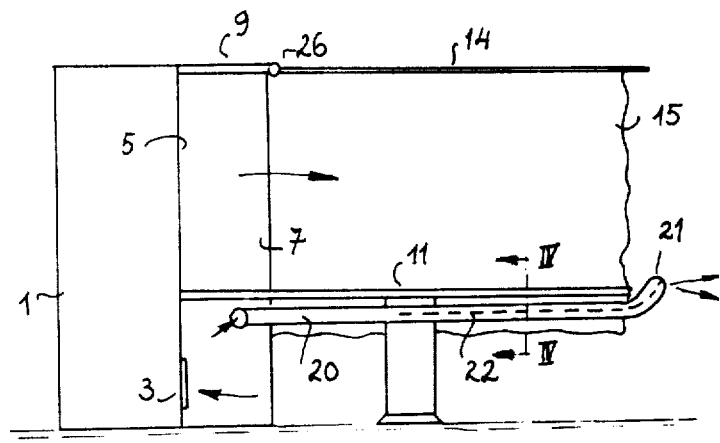
FIG. 3 is a simplified section of the device of FIG. 1 with additional air discharge openings.
Figure 4:
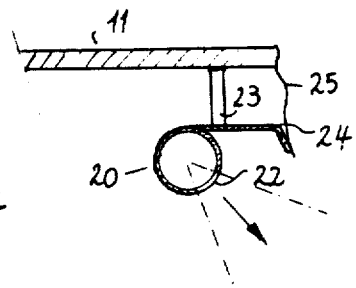

FIG. 4 a simplified section on increased scale on the line IV—IV of FIG. 3; and

Figure 5:
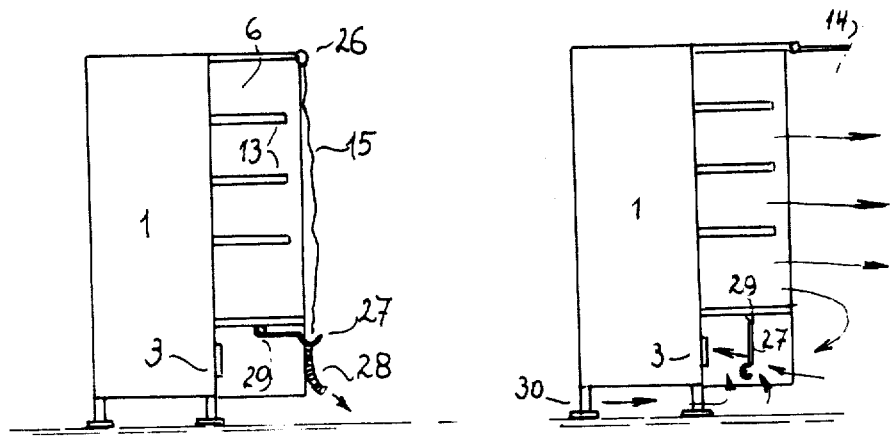

FIG. 5 a part of the device of FIG. 3 with other auxiliary means in two different conditions.

The device shown comprises a filter cabinet 1, in the lower part of which a number of fans 2 is arranged, the intake opening 3 being positioned at the front side near the bottom. These intake openings may be provided, if required, with coarse filters. These fans below the air sucked in through dust filters 4 which are adapted to remove substantially all the dust and therefore also the germs from the air. Subsequently, the air is discharged through exit grids 5 as a horizontal air flow.

The cabinet 1 preferably consists of three separate units with separate fans which are separately variable. The grids 5 are joined by vertical outer and inner guiding baffles 6 and 7 respectively, as well as a horizontal lower baffle of equal depth and a horizontal upper baffle 9 having a larger forward extension.

The central 10 between both inner baffles 7 is nearly of equal width as an operating table 11 which is pushed between the baffles 7. The air flow discharged between these baffles flows along the operating table 11, the upper baffle 9 insuring that admixed non-sterile air reaches the table top level only beyond the other extremity of the operating table.

The spaces 12 defined between a lateral baffle 6 and an inner baffle 7 have a width which is substantially equal to the width of the working space at the respective side of the operating table 11 required for the surgeons and the assistants. The latter move therefore with their upper bodies also in an air flowing opposing the penetration of contaminated air into the operation area. Germs originating from the upper bodies and, in particular, the heads of these persons are removed parallel to the table surface by the air flow.

The spaces 12 may be provided with shelves 13 in order to enable a germ-free storage of operation accessories. In this manner it is possible to prevent that dust deposited on the outer surface of bags in which sterilized instruments, dressings and the like are wrapped, will land in the dust-free area when opening these bags.

In order to prevent germs from penetrating into the operating area as a consequence of air turbulences behind the surgeons and the assistants, it is advisable to provide guides 14 joining the upper baffle 9, along which guide curtains 15 made of plastic may slide, which curtains are adapted to isolate both sides of the space to be kept germ-free from penetrating air flows. These curtains extend slightly below the upper surface of the operating table 11, where, approximately, the boundary region between the germ-free air flow leaving the filters 4 and the air flows sucked in along the floor by the fans 2. The feet and a part of the legs of the surgeons and the assistants are, then, situated in the latter air flow, and need not to be kept germ-free. The upper bodies of these persons are, at any rate, covered by sterilized clothing which may be maintained germ-free during a substantial time without difficulties. It is advisable to extend the lateral baffles 6 downwards to the vicinity of the floor as shown in the drawing.

At the side walls of the filter cabinet 1 pouches 16 are provided in which the curtains 14 can be stored when not in use. Thus contamination of the curtains will be avoided, and, moreover, sterilizing thereof is facilitated, since a disinfecting liquid such as peracetic acid may be easily sprayed in these pouches without inconvenience for the environment.

It may occur that, at the free extremity of the operating table 11, the air speed has become too low, since it cannot be avoided that the air flow will laterally diverge. Moreover, the anaesthesist is, in general, sitting at the end with his instruments, so that a certain disturbance of the air flow may take place, and, moreover, germs from the anaesthesist may reach the patient's head when the air speed is too low. In order to avoid a too high outflow speed at the exit side of the filter 4, which would lead to an increased desiccation of the surgical wounds and necessarily also to an increase of the noise, it is advisable to provide an additional discharge nozzle 17 at the head of the operating table 11 adapted to blow germfree air parallel to the longitudinal axis of the table, and thus contributing to a local reinforcement of the air flow. This nozzle may be connected to the lower part of the central filter unit below the operating table by means of ducts not shown. It is however, also possible to use a separate filter unit for this purpose. In order to prevent also lateral disturbances in the air flow, in particular in the vicinity of an arm rest 18 of the operating table, lateral discharge nozzles 19 may be provided near the nozzles 17.

Figure 1:
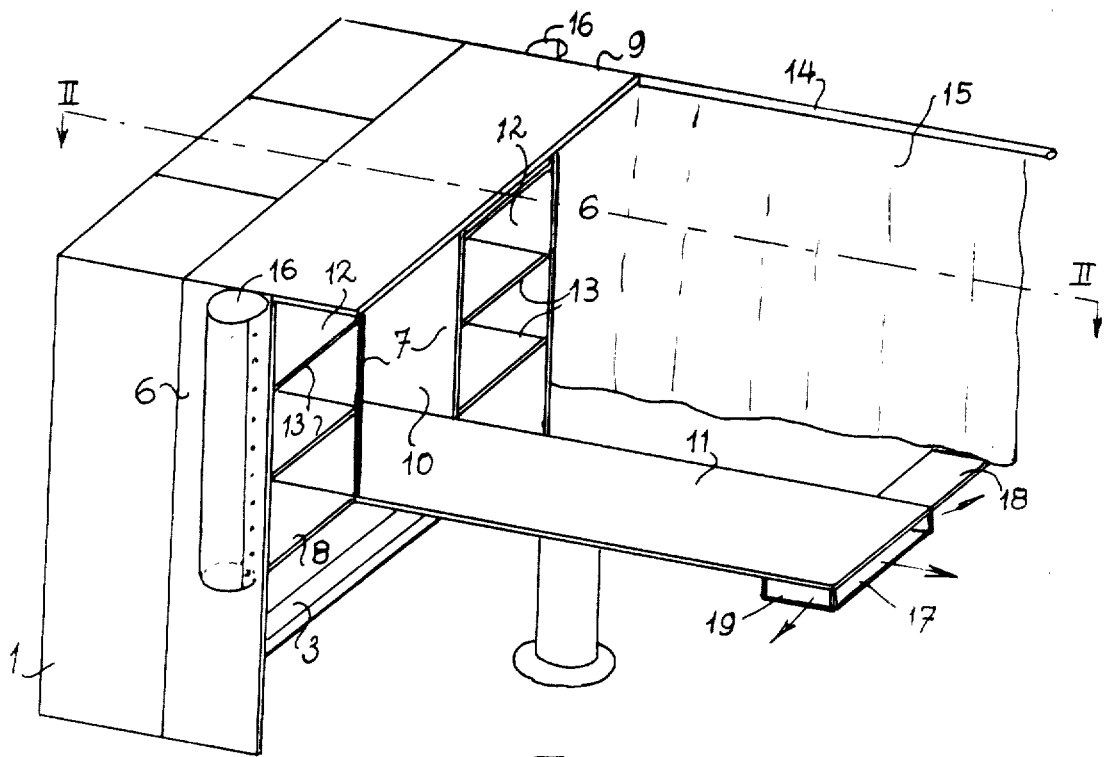
Figure 2:
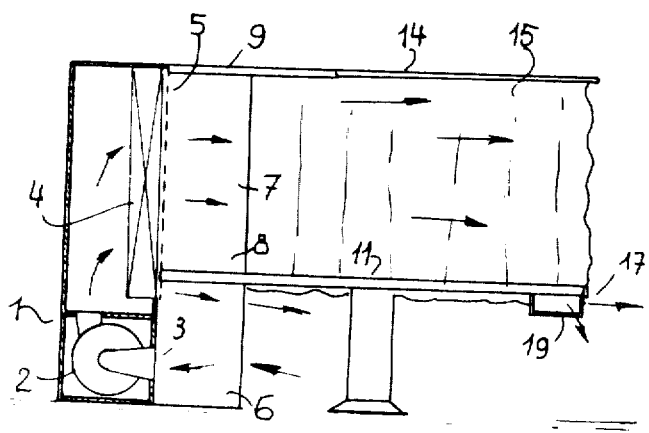
FIG. 2 is a section on the line II—II of FIG. 1.

It may, however, be advisable to provide such additional discharge nozzles also in the vicinity of the lateral filter units below the plane of the table top. As shown in FIG. 2, the exit grids 5 of these units may, to that end, be extended downwards below the lower baffle 8. It is, for the same purpose, also possible to provide additional discharge nozzles which may, for instance, be connected to a separate filter unit. The use of separate filter units for the nozzles 17 and 19 and for the additional nozzles of the lateral filter units may be favorable, since, then, the speed of the air flows produced thereby may be varied at will. Since the curtains 15 end not far below the table surface, the lateral expansion of these additional air flows is not impeded thereby.

A device constructed in this manner may remain fully independent of the operating table, and may, for instance, be provided with castor wheels so as to be adapted to be placed at one extremity of an arbitrary existing operating table. This is especially favorable, since operating tables are, in general, fixedly mounted and are provided with electrically or hydraulically operating auxiliary means for varying the orientation of the table, as well as with lamps positioned over the table and the like. Moreover, such a filter device may be positioned in an arbitrary space, which may be extremely important, especially in emergency cases. Apart from the application of such a device for special surgical cases, it is also suitable for use in spaces in which the current disinfection measures are difficult to be applied, as in emergency or field hospitals and the like.

The device shown in FIG. 3 comprises some additional parts. FIG. 3 shows a U-shaped tube 20 extending along the lower side of the table 11, its transverse part 21 being slightly bent upwards and extending along the free extremity of the table. This tube is provided with apertures 22, and both its extremities are connected either to a part of the filter assembly in the cabinet 1, or to a separate fan-filter unit. This tube 20 extends along a substantial part of the lateral edge of the table 11, and generally up to about midway of its length.

The air flows leaving the apertures 22 prevent ambient air from penetrating below the curtains 15 when the air flow directed along the table is too weak for preventing this penetration itself near the free extremity of this table. As mentioned already, amplification of the air flow along the table is generally, objectionable. The apertures 22 may be constituted by a series of slots in the side wall of the tube.

FIG. 4 shows a practical embodiment of the mounting of such a tube 20. This tube is connected to the lower side of the table 11 by means of supports 23, and, moreover, a distance piece 24 is provided preventing an operating table cloth 25 from obstructing the discharge openings 22. If desired, the distance pieces 24 may be shaped as cloth clamps.

From FIG. 4 it will also appear that the discharge apertures 22 are directed obliquely downwards, and preferably so that the axis of the emitted air includes an angle of about 30° with the vertical. In this manner it is prevented that the air is blown against the bodies of persons standing around the operating table which would disturb the effect of these air flows. Also the air flows leaving the transverse part 21 are directed downwards, i.e. about towards the legs of the anaesthesist sitting at that extremity of the table. The air flows directed in this manner effectively prevent dust carrying ambient air from penetrating from below into the space within the curtains 15. The length of the tube 22 is chosen so that these air flows begin where the substantially horizontal air flow leaving the filter cabinet 1 is no longer capable of performing this task alone.

FIG. 5 shows a section of the device without the operating table 11, and further shows some additional parts. The guides 14 for the lateral curtains 15 are, now, provided with hinges 26 near their connection to the filter cabinet 1 or its side walls, said hinges allowing the guides to be folded horizontally before the space between the guiding baffles 6 and the exit grids 5 of the cabinet 1. The curtains 15 may then close this space so that it may be effectively disinfected, for instance by spraying a disinfectant such as peracetic acid.

Along and below the front edge of the lower baffle 8 a collecting trough 27 with a discharge duct 28 is provided for collecting the disinfectant dripping along the closed curtains 15 and the bottom 8. The height of this trough is chosen so that the lower rim of these curtains is inside the trough. The support for this trough comprises hinges 29 allowing the trough to be swung backwards when not in use.

The duct 28 may, for instance, be connected to the intake side of a separate fan filter unit for the tube 22, the exit side of this unit then being put into communication with the atmosphere, and a filter is included in the connection with the duct 28 for absorbing the disinfectant used. In this manner it may be prevented that mists of vapours of the disinfectant which are, in general, very inconvenient, are blown into the surroundings.

During normal operation of this device, a substantial part of the air taken in through the opening 3 is derived from the space between the curtains 15. This is, as such, unfavorable, since, then, the useful air flow along the operating table is weakened, but this is, on the other hand, favorable in that this air flow flows along the trough 27 when folded, so that in that condition this trough is kept free from contamination by dust from the surroundings. In a preferred embodiment according to the invention the filter cabinet is supported on feet 30 allowing more air to flow towards the opening 3 from the surroundings, and, nevertheless, the trough remains in the air flow which was already filtered.

When the feet 30 are made adjustable, it will be possible to adapt the cabinet 1 to the length of persons working at the operating table 11. In practice also the height of this table 11 is adapted to the tallest person, and shorter persons will use foot-stools. It is favorable to adjust also the filter cabinet in the same sense, so that the air flow distribution over the table will be the same in all conditions. The adjustment of the length of the feet may be done in any suitable manner, for instance by pressurized oil.

It will be clear that many modifications are possible within the scope of the invention.

I claim:

1. A device for providing germ-free air flow above an operating table on which a patient is to be placed who is to be isolated as to air from the environment of the table and from the room in which the table is located, said operating table having first and second opposite ends and two sides, the device having a cabinet with blower means in said cabinet, the blower means having an air intake and an air outlet, the cabinet further containing air filter means to filter said airflow and having an air exit arranged vertically for discharging laminar air flow in a substantially horizontal direction, said operating table being disposed with said first end positioned adjacent the cabinet, so that the air, as blown and discharged, flows in a longitudinal direction in relation to said table, the improvement comprising:

said exit being divided into three portions; a central portion, through which air is blown and discharged adjacent to the first end of the table to yield an air flow above and along the table and two lateral portions on opposite sides of said central portion, the exit having a lower border sufficiently above the floor so that air is not blown over the floor surface;

each of said two lateral portions having outwardly extending baffle portions on both sides thereof to direct air laterally and alongside said table into the area occupied by a person or persons standing at the sides of said table;

the air intake for the blower means disposed below the exit to suck air from underneath said table, thereby creating a low pressure region under the flow along the underside of the table; curtains extending from the outwardly extending baffle portions located farthest from the operating table, along said table, said curtains being suspended from guides extending from the upper portions of said baffles, the curtains having lower edges ending above the floor, but below the table, so that the air blown from the lateral exit portions flows along the curtains and is confined therewith;

the blower means being capable of providing substantially horizontal air flow over the whole length of the table when the air is discharged from the central as well as the lateral portions of the exit; and means defining additional discharge means connected to receive germ free air from said blower and having first discharge means adjacent the second end of the table opposite the cabinet for blowing air laterally away from the table, transverse to said longitudinal direction.

2. The device of claim 1 wherein said outer vertical baffles extend downwardly substantially to the floor.

3. The device of claim 1 wherein said guides are provided with hinges allowing the curtains, which are suspended from the guides, to be swung in front of and parallel to the exit surface of the filter cabinet and means for positioning a collecting trough below the curtains, when they are parallel to the exit surface, such that the lower rim of the closed curtains hangs in this trough.

4. In the device of claim 1 wherein the lower border of each of the lateral openings extends below the underside of the table.

5. The device of claim 1 wherein said additional discharge means further comprises second discharge means at the second end of the table for blowing air in a longitudinal direction away from the table.

6. The device of claim 1 wherein said additional discharge means extends alongside a portion of the length of said table on each side thereof, and said first discharge means being arranged to direct air flow down and away from the table to create an air curtain therealong.

7. The device of claim 6 wherein the additional discharge means consists of a U-shaped tube, having openings therein, which extends along the sides and second end of said table.

* * * * *